United States Patent
Devereux et al.

[19]

[11] Patent Number: 5,961,631
[45] Date of Patent: Oct. 5, 1999

[54] DATA PROCESSING APPARATUS AND METHOD FOR PRE-FETCHING AN INSTRUCTION IN TO AN INSTRUCTION CACHE

[75] Inventors: Ian Victor Devereux; Nicholas Andrew Salter, both of Cherry Hinton, United Kingdom

[73] Assignee: Arm Limited, Cambridge, United Kingdom

[21] Appl. No.: 08/893,982

[22] Filed: Jul. 16, 1997

[51] Int. Cl.⁶ .................................................. G06F 13/00
[52] U.S. Cl. ............................................................ 712/207
[58] Field of Search ............................ 711/118; 712/207, 712/225, 1

[56] References Cited

U.S. PATENT DOCUMENTS

| | | | |
|---|---|---|---|
| 4,648,034 | 3/1987 | Heninger | 395/290 |
| 4,729,093 | 3/1988 | Mothersole et al. | 395/383 |
| 4,991,080 | 2/1991 | Emma et al. | 395/382 |
| 5,029,073 | 7/1991 | Takaya et al. | 395/800.34 |
| 5,155,828 | 10/1992 | Fetra et al. | 711/120 |
| 5,504,930 | 4/1996 | Kobayashi et al. | 395/800 |
| 5,507,000 | 4/1996 | Stewart et al. | 395/800.34 |
| 5,761,506 | 6/1998 | Angle et al. | 395/672 |
| 5,771,391 | 6/1998 | Lloyd et al. | 395/800.01 |
| 5,838,984 | 11/1998 | Nguyen et al. | 395/800.05 |

*Primary Examiner*—David Y. Eng
*Attorney, Agent, or Firm*—Nixon & Vanderhye P.C.

[57] ABSTRACT

The present invention provides a data processing apparatus for fetching an instruction in to an instruction cache, comprising an instruction cache for storing instructions, and a processor core for outputting an instruction address to the instruction cache on an instruction address bus, and for receiving the instruction corresponding to that instruction address on an instruction data bus The processor core is arranged to issue a predetermined control signal to the instruction cache when outputting the instruction address to cause the instruction cache to perform an instruction fetch procedure. In accordance with the present invention, a coprocessor is provided for executing a first predetermined instruction also executed by the processor core, the first predetermined instruction causing the coprocessor to issue the predetermined control signal to the instruction cache, and causing the processor core to output to the instruction cache the instruction address data for an instruction to be added to the instruction cache without issuing the predetermined control signal. Further, the instruction cache is responsive to the predetermined control signal from the coprocessor and the instruction address from the processor core to perform the instruction fetch procedure, and, if this results in a cache miss, to cause the retrieval of the instruction from memory for storage in the instruction cache, the processor core being arranged to ignore the retrieved instruction. The above approach allows an instruction to be pre-fetched and stored in the instruction cache without that instruction being returned to the processor core for execution, and without any additional logic needing to be added to the instruction cache to support pre-fetching.

16 Claims, 4 Drawing Sheets

DATA PROCESSING APPARATUS AND METHOD FOR PRE-FETCHING AN INSTRUCTION IN TO AN INSTRUCTION CACHE

BACKGROUND OF THE INVENTION

1. Field of the Invention

The present invention relates to a data processing apparatus and method for fetching an instruction in to an instruction cache, and in particular to such a data processing apparatus and method that enables an instruction to be pre-fetched in to an instruction cache without that instruction being passed to a processor core within the data processing apparatus for execution.

2. Description of the Prior Art

Typically, a data processing apparatus, such as a microprocessor, is arranged to apply instructions received to data items read from memory, a processor core being provided within the microprocessor to process the instructions. In order to reduce the number of accesses required to memory in order to retrieve the instructions and the data, it is known to provide one or more caches which are accessible to the processor core. One approach is to provide a single cache for storing both instructions and data required by the processor core, such an arrangement being known as a Von Neumann architecture. However, alternatively, a separate instruction cache can be provided for storing instructions, and a separate data cache be provided for storing data values, such an arrangement being known as a Harvard architecture.

With the Von Neumann architecture, the processor core is able to execute certain instructions in order to pre-fetch either instructions or data values into the single cache prior to those instructions or data values being required by the processor core, such a process being known as a pre-fetch process. Similarly, with regard to the data cache in a Harvard architecture arrangement, the processor core again is able to execute certain "load" instructions in order to pre-fetch data values for storage in the data cache.

However, with regard to the instruction cache of a Harvard architecture arrangement, it is generally not possible to add an instruction to the instruction cache without that instruction being returned to the processor core, and added to the pipeline for subsequent processing by the processor core. This is because whenever the processor core outputs an instruction address on an instruction address bus to the instruction cache, it will also issue a predetermined control signal to the instruction cache to cause the instruction cache to perform an instruction fetch procedure, this ultimately resulting in the fetched instruction being output on an instruction data bus back to the processor core for subsequent execution by the processor core.

Hence, it is an object of the present invention to provide a data processing apparatus and method which enables instructions to be pre-fetched into an instruction cache without those instructions being returned to the processor core for subsequent processing by the processor core.

SUMMARY OF THE INVENTION

Accordingly, the present invention provides a data processing apparatus for fetching an instruction in to an instruction cache, comprising: an instruction cache for storing instructions; a processor core for outputting an instruction address to the instruction cache on an instruction address bus, and for receiving the instruction corresponding to that instruction address on an instruction data bus, the processor core being arranged to issue a predetermined control signal to the instruction cache when outputting the instruction address to cause the instruction cache to perform an instruction fetch procedure; a coprocessor for executing a first predetermined instruction also executed by the processor core, the first predetermined instruction causing the coprocessor to issue the predetermined control signal to the instruction cache, and causing the processor core to output to the instruction cache the instruction address data for an instruction to be added to the instruction cache without issuing the predetermined control signal; the instruction cache being responsive to the predetermined control signal from the coprocessor and the instruction address from the processor core to perform the instruction fetch procedure, and, if this results in a cache miss, causing the retrieval of the instruction from memory for storage in the instruction cache, the processor core being arranged to ignore the retrieved instruction.

Hence, the first predetermined instruction causes the processor core to output coprocessor data, in this instance an instruction address for an instruction to be added to the cache, preferably this coprocessor data being output on the instruction address bus to the instruction cache. Further, the first predetermined instruction causes the coprocessor to issue the predetermined control signal to the instruction cache, thereby causing the instruction cache to perform an instruction fetch procedure based on the coprocessor data sent to the instruction cache by the processor core. If this results in a cache miss, due to the instruction corresponding to the instruction address not being found within the instruction cache, then that instruction (or preferably an entire cache line) will be retrieved from memory for storage in the instruction cache. In addition, the instruction will typically be output on the instruction data bus to the processor core. However, since the processor core will not have issued the predetermined control signal itself, it will not be arranged to read the instruction placed on the instruction data bus.

In a typical Harvard arrangement, the processor core would not be arranged to be able to output coprocessor data on the instruction address bus, but instead would only be able to output coprocessor data on a data data bus connecting the processor core to the data cache. However, in accordance with preferred embodiments, the data processing apparatus of the present invention employs a technique whereby the address buses can be used to output data values. In normal operation, a coprocessor often requires access to data values stored within registers of the processor core. Hence it is known to provide a certain category of instructions, which will be referred to hereafter as Move to Coprocessor Register (MCR) instructions, which are executable by both the processor core and the coprocessor in order to transfer the contents of the processor core registers to coprocessor registers. Typically, the coprocessor registers would be connected to a data bus over which the processor core could output the necessary data values. However, in an attempt to reduce the wiring overhead, it has been found that certain of these coprocessor registers can be more efficiently connected to one of the processor core address buses, and that the processor core can then be arranged to output the data values on the address buses, either instead of, or in addition to, outputting the data values on the data bus. In preferred embodiments, the apparatus of the present invention employs this technique in order to enable the processor core to output the coprocessor data, in this instance an instruction address for an instruction to be added to the cache, on the instruction address bus as a result of executing the first predetermined instruction.

Hence, the above technique allows an instruction to be pre-fetched and stored in the instruction cache without that instruction being returned to the processor core for execution, and without any additional logic needing to be added to the instruction cache to support pre-fetching. Further, in a system that also has memory translation or memory protection logic, that logic can be responsive to the predetermined control signal from the coprocessor in the same way as from the processor core, and hence will treat the instruction pre-fetch in exactly the same way as a normal instruction fetch. Hence, just as for a normal instruction fetch, if the prefetch fails any protection check, the instruction will not be prefetched in to the cache.

Preferably, the first predetermined instruction is a Move to Coprocessor Register (MCR) instruction.

Further, in preferred embodiments, the coprocessor has a number of coprocessor registers whose stored data values are used to control the operation of the instruction cache, a second predetermined Move to Coprocessor Register (MCR) instruction being executable to cause the coprocessor to issue an instruction to one of said number of coprocessor registers to store a data value defining the cache line pointed to by the instruction cache pointer, and to cause the processor core to output that data value for storage in the coprocessor register.

This second predetermined Move to Coprocessor Register instruction may hence be used to move the instruction cache pointer to a predetermined cache line, prior to the execution of the first predetermined Move to Coprocessor Register instruction described earlier. Hence, pre-fetched instructions may be stored within the instruction cache at a desired cache line, or cache lines.

In preferred embodiments, the data processing apparatus further comprises a data cache for storing data values, the data cache being connected to the processor core by a data address bus and a data data bus; the processor core being arranged to output data addresses to the data cache over the data address bus, and being arranged to receive over the data data bus data values corresponding to data addresses output by the processor core on the data address bus, or to output over the data data bus data values to the data cache; the coprocessor registers being connected to the data data bus, or to the data address bus. If the coprocessor register is connected to the data address bus, the coprocessor is preferably arranged to send a signal to the processor core to cause the processor core to output the data value on the data address bus.

Alternatively, the coprocessor register may be connected to the instruction address bus, and the coprocessor is then arranged to send a signal to the processor core to cause the processor core to output the data value on the instruction address bus.

Hence, in accordance with preferred embodiments of the present invention, not only the data data bus, but also the data address bus and the instruction address bus may be used to route data values to coprocessor registers. It has been found that this technique can significantly reduce the amount of wiring required within the data processing apparatus to route data values to registers.

Preferably, the predetermined control signal is issued by the processor core over an instruction control bus connected to the instruction cache. In preferred embodiments, this predetermined control signal is referred to as an Instruction Memory Request (InMREQ). In the absence of the InMREQ signal, the instruction cache will ignore any address on the instruction address bus and further the processor core will ignore any data returned on the instruction data bus.

In preferred embodiments, in the event of a cache miss, a whole cache line containing the instruction is retrieved from memory for storage in the cache. This has proven to be an efficient way of retrieving instructions from memory, since it is likely that adjacent instructions to the one currently required will also subsequently need to be retrieved.

Preferably, a third predetermined Move to Coprocessor Register (MCR) instruction is executable to cause the coprocessor to issue an instruction to one of said number of coprocessor registers to store a data value defining a number of cache lines which are to be locked down in the instruction cache to avoid subsequent overwriting of the instructions stored in those cache lines, and to cause the processor core to output that data value for storage in the coprocessor register.

Again, the coprocessor register may be connected to either the data data bus, the data address bus, or the instruction address bus, and the processor core can be arranged to output the data value on the appropriate bus. This third predetermined move to coprocessor register instruction may hence be used after a certain number of instructions have been pre-fetched into the cache, in order to define a number of cache lines which are to be locked down, and hence not overwritten by any subsequent instructions fetched to the cache.

Viewed from a second aspect, the present invention provides a method of operating a data processing apparatus to fetch an instruction in to an instruction cache, comprising the steps of: outputting from a processor core an instruction address to the instruction cache on an instruction address bus; outputting from the processor core a predetermined control signal to the instruction cache when outputting the instruction address to cause the instruction cache to perform an instruction fetch procedure; receiving at the processor core on an instruction data bus the instruction corresponding to the instruction address; arranging a coprocessor and the processor core to execute a first predetermined instruction, the first predetermined instruction causing the coprocessor to issue the predetermined control signal to the instruction cache, and causing the processor core to output to the instruction cache the instruction address data for an instruction to be added to the instruction cache without issuing the predetermined control signal; arranging the instruction cache to perform the instruction fetch procedure in response to the predetermined control signal from the coprocessor and the instruction address from the processor core; if the instruction fetch procedure results in a cache miss, retrieving the instruction from memory for storage in the instruction cache, the processor core being arranged to ignore the retrieved instruction.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Before describing an apparatus according to the preferred embodiment of the present invention, a technique used by apparatus of the preferred embodiment will first be described with reference to FIGS. 1 and 2.

Figure 1:
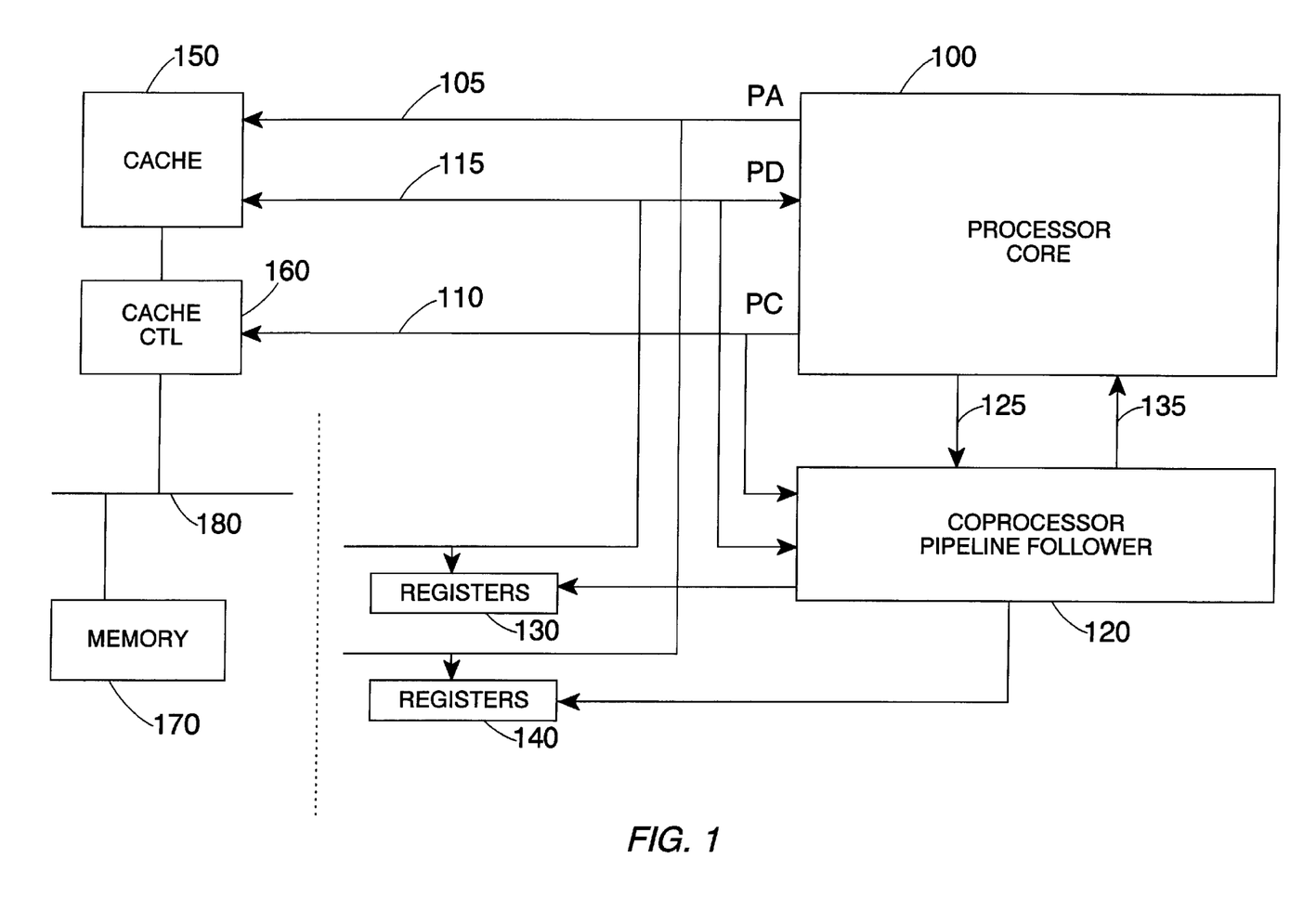
FIG. 1 is a diagram illustrating a data processing circuit, in which a single cache is used to store both instructions and data values, and in which a technique is used to enable data values to be output on the address bus.
Figure 2:
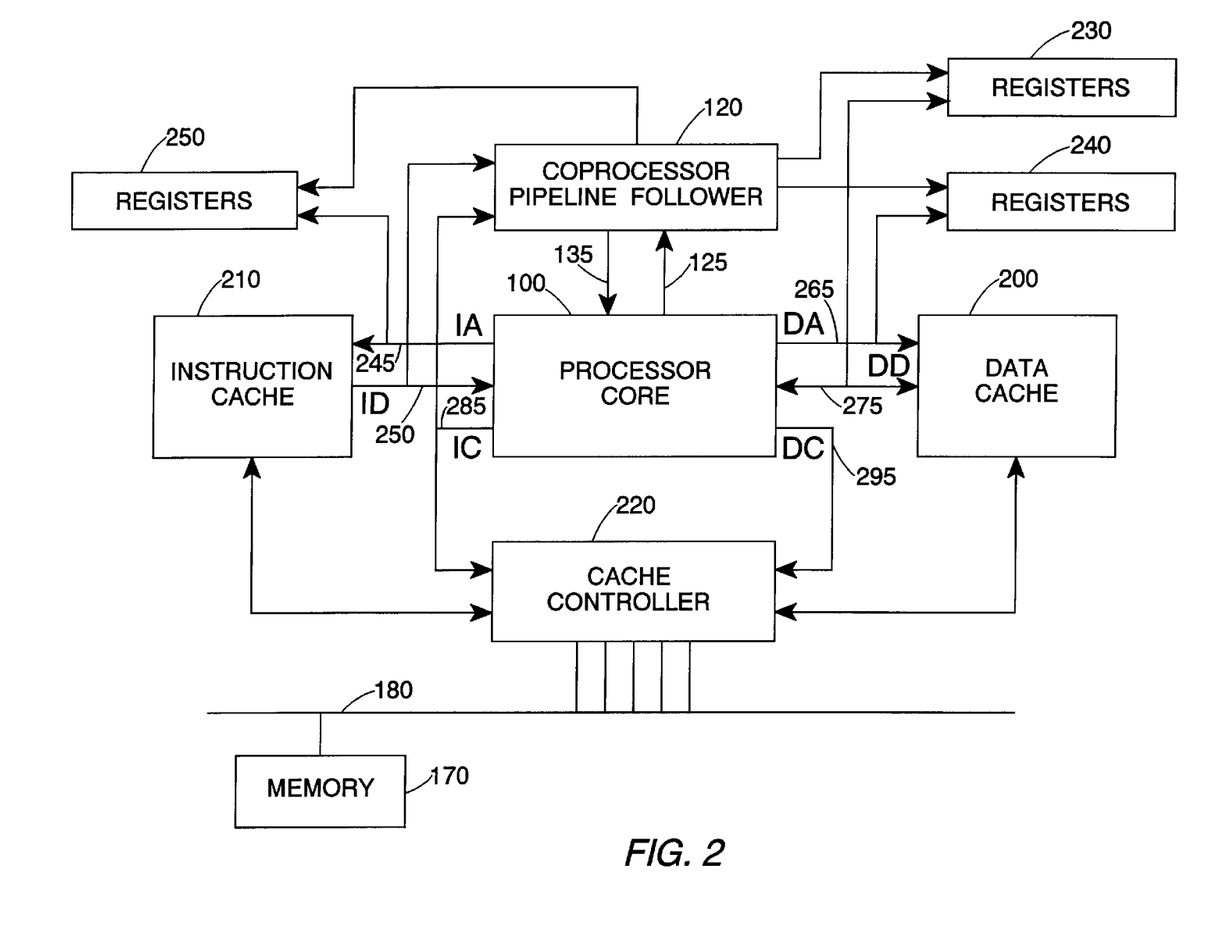
FIG. 2 is a diagram illustrating a data processing circuit, in which a separate instruction cache and data cache are provided, and in which a technique is used to enable data values to be output on the address buses.

FIG. 1 illustrates a data processing apparatus, in which a single cache 150 is used for storing both instructions and data values. When the processor core 100 requires an instruction or a data value, it places the memory address of that instruction or data value on the processor address (PA) bus 105. Further, the processor core 100 issues a processor control signal on the processor control (PC) bus 110. The processor control signal includes information such as whether the address corresponds to a read or a write request, the type of access (e.g. sequential), the size of the access (e.g. word, byte), the operating mode of the processor (e.g. supervisor or user), etc. This processor control signal is received by the cache controller 160, and prompts the cache controller to determine whether the required instruction or data value is stored within the cache 150. The cache controller 160 instructs the cache 150 to compare the address on the address bus 105 with the addresses in the cache to determine whether the instruction or data value corresponding to that address is stored within the cache. If so, that instruction or data value is output from the cache 150 onto the processor data (PD) bus 115 where it is then read by the processor core 100. If the instruction or data value corresponding to the address is not within the cache 150, then the cache controller 160 causes that instruction or data value to be retrieved from memory 170 over the external bus 180. The retrieved instruction is then stored in the cache 150 and returned to the processor core 100 over the data bus 115.

In addition to receiving instructions or data values over the processor data bus 115, the processor core 100 may also output data values over the data bus 115 to the cache 150 for storage in the cache. These data values may then be later retrieved by the processor core 100 when required for subsequent processing operations.

The data processing apparatus also includes a coprocessor pipeline follower 120 which is connected to the processor core 100 via control lines 125 and 135, these control lines enabling the coprocessor 120 and processor core 100 to stay in synchronisation with one another.

The coprocessor 120 is connected to the processor control bus 110, and hence is arranged to receive the processor control signals output by the processor core 100. This information may be used by the coprocessor 120 to determine when the processor core is issuing requests for instructions, and in such cases the coprocessor 120 is arranged to read from the processor data bus 115 the instructions returned from the cache 150 to the processor core 100.

As instructions are returned to the processor core 100, they enter a pipeline, where they are decoded and subsequently executed. A similar pipeline preferably exists within the coprocessor 120, and the instructions entering the processor core pipeline also enter the coprocessor pipeline.

In a typical arrangement, not all of these instructions will require direct execution by the coprocessor 120, and the coprocessor is arranged to determine those instructions that require execution by the coprocessor. Further, control information will typically be passed between the coprocessor and the processor core via lines 125 and 135 so that the coprocessor can track the execution of instructions in the processor core, and then execute any instructions it has to execute at the same time as they are executed by the processor core. One such instruction that needs to be executed by the coprocessor is a Move to Coprocessor Register (MCR) instruction, which is executed by both the processor core 100 and the coprocessor 120. This instruction is generally used to transfer the contents of a register within the processor core to one of the coprocessor registers. As mentioned earlier, these coprocessor registers may be distributed throughout the data processing apparatus, the registers 130 and 140 representing such coprocessor registers. In prior art arrangements, the coprocessor would respond to an MCR instruction by issuing a command to the appropriate coprocessor register instructing it to read a data value from the data bus. Further, the processor core 100 would respond to the MCR instruction by outputting the appropriate data value on the data bus 115.

However, as explained earlier, this results in significant wiring overhead, since the data bus must be routed via all of the coprocessor registers that may be updated with data values output by the processor core. In preferred embodiments of the present invention, this problem is alleviated by enabling the processor core 100 to not only output the data value on the data bus 115, but also to output the data value on the address bus 105.

Hence, if the MCR instruction results in the coprocessor 120 issuing a command to one of the registers 130, then the processor core will, in the usual manner, output the data value on the data bus 115, and the register 130 will read that data value from the data bus. However, if the MCR instruction results in the coprocessor 120 issuing a command to one of the registers 140, then the coprocessor 120 will also issue a signal to the processor core 100 over the path 135 to cause the processor core to not only output the data on the data bus 115 but also on the address bus 105. The register 140 will then read the data value from the address bus 105. As an alternative to arranging the processor core to either output the data value on just the data bus or alternatively on both the data bus and the address bus, it will be apparent to those skilled in the art that the processor core could be arranged to either output the data values solely on the data bus, or solely on the address bus.

In an alternative embodiment, it will be appreciated that the processor core can be arranged to always output the data value on both the address bus 105 and the data bus 115, in which case the coprocessor 120 will not need to issue a signal to the processor core 100.

By using the above approach, it is no longer necessary for the data bus 115 to be routed to the registers 140. Instead, if the address bus 105 is already situated physically closer to the registers 140 than the data bus 115, then the above described technique enables the registers 140 to be connected to the address bus instead of the data bus, thereby avoiding the wiring overhead of routing the data bus 115 to those registers 140.

The cache arrangement illustrated in FIG. 1 is known as a Von Neumann architecture, this being the name given to architectures that employ a single cache for both instructions and data. An alternative approach is to have a separate instruction cache and a separate data cache, this architecture being referred to as a Harvard architecture. FIG. 2 is a diagram of a data processing apparatus, in which a Harvard architecture is employed. As illustrated in FIG. 2, the processor core 100 is connected to an instruction cache 210 via instruction bus lines, and to a data cache 200 via data bus lines. A single cache controller 220 is shown for controlling both the instruction cache 210 and the data cache 200. However, alternatively, separate cache controllers may be provided, one for the instruction cache 210 and one for the data cache 200.

The processor core 100 is arranged to issue addresses for instructions on the instruction address bus 245, at which point the processor core also issues a processor control signal on the instruction control bus 285. This processor control signal will be referred to hereafter as an Instruction Memory Request (InMREQ) signal, this signal informing the cache controller 220 that the instruction cache 210 should compare the address on the instruction address bus 245 with the addresses in the instruction cache 210 to determine whether the instruction corresponding to that address is stored within the cache. If so, the instruction is output from the instruction cache 210 on the instruction data bus 250 where it is then read by the processor core 100. If the instruction corresponding to the address is not within the cache 210, then the cache controller 220 causes the instruction to be retrieved from memory 170 via the external bus 180. The retrieved instruction is then stored in the cache 210 and returned to the processor core 100 over the instruction data bus 250.

Similarly, addresses for data values may be output on the data address bus 265, and a Data Memory Request (DnMREQ) signal is then output on the data control bus 295 to the cache controller 220. This will cause the data cache 200 to return the data value corresponding to that address on the data data bus 275 if that data value is stored within the data cache, or otherwise the cache controller 220 will retrieve the data value from the memory 170, at which point the data value will be stored in the data cache 200 and returned to the processor core 100 over the data data bus 275. Additionally, the processor core 100 can output data values to be stored in the data cache on the data data bus 275.

The coprocessor pipeline follower 120 operates in the same way as described with reference to FIG. 1. Hence, it receives the InMREQ signals output by the processor core on the instruction control bus 285, and is arranged to receive the instructions returned to the processor core 100 over the instruction data bus 250. When an MCR instruction is executed, the coprocessor 120 will send an instruction to one of its registers 230, 240, 250 requesting those registers to read a data value output by the processor core. As discussed earlier, in prior art arrangements, the processor core would have output this data value on the data data bus 275. However, in accordance with preferred embodiments of the present invention, the registers of the coprocessor may actually be connected to either the data data bus 275, the data address bus 265, or indeed the instruction address bus 245. Thus, as illustrated in FIG. 2, the registers 230 are connected to the data data bus 275, the registers 240 are connected to the data address bus 265, and the registers 250 are connected to the instruction address bus 245.

If the coprocessor 120 issues a write command to one of the registers 240 as a result of executing the MCR instruction, then it also sends a signal via path 135 to the processor core 100 to cause the data value to be output by the processor core on the data address bus 265. Similarly, if the MCR instruction causes the coprocessor to send a write command to one of the registers 250, the coprocessor 120 also sends a signal over path 135 to cause the processor core 100 to issue the data value on the instruction address bus 245.

Hence, by taking advantage of the proximity of certain coprocessor registers to either the data address bus 265 or the instruction address bus 245, the requirement to route the data data bus 275 via those coprocessor registers is removed. Instead, those registers are merely connected to the data address bus 265 or the instruction address bus 245, as appropriate, and the technique of the preferred embodiment is used to route data values via those address buses when required.

Figure 3:
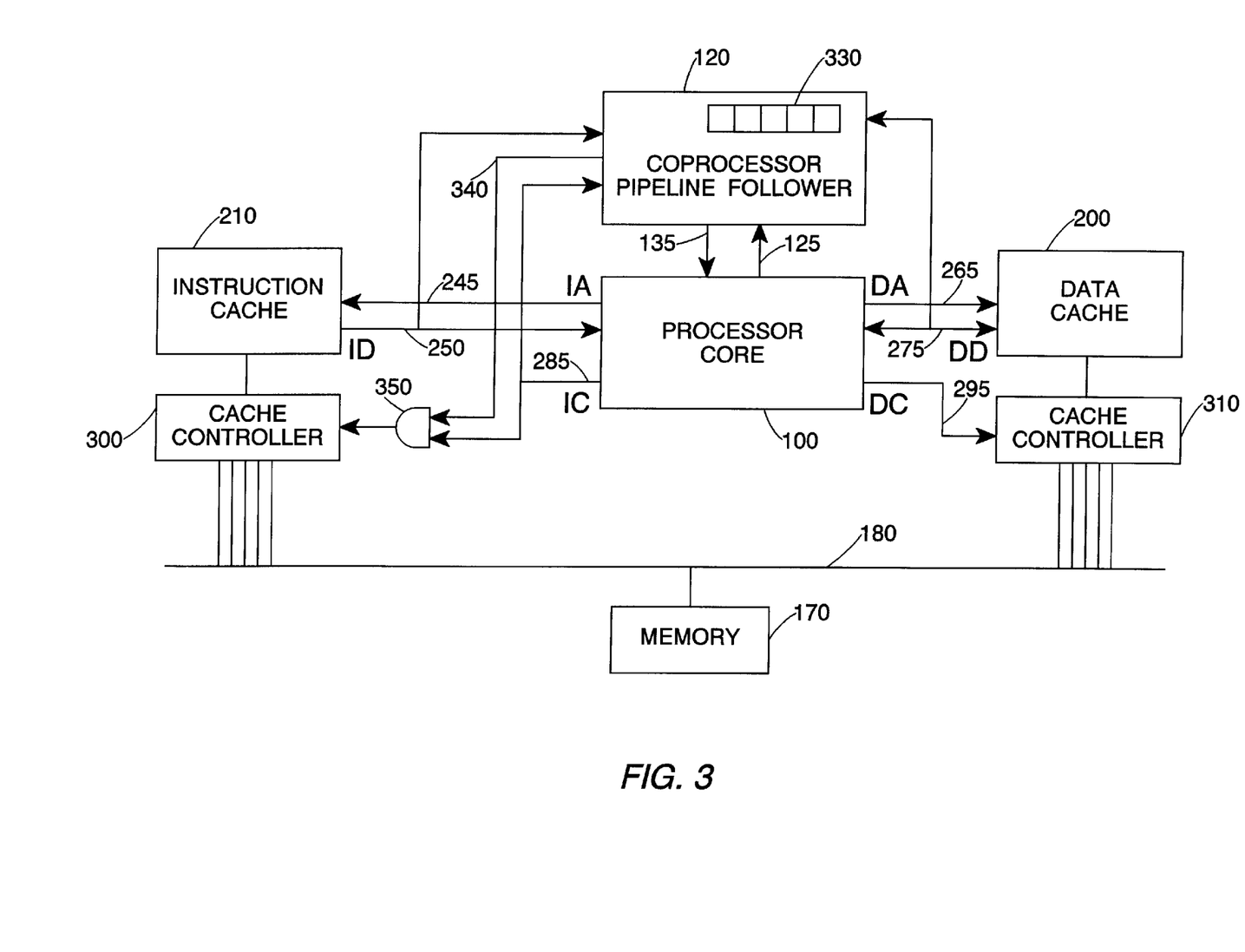
FIG. 3 is a diagram illustrating how instructions may be pre-fetched for storage in an instruction cache in accordance with preferred embodiments of the present invention.

FIG. 3 illustrates a data processing apparatus that employs a Harvard architecture, and is arranged in accordance with preferred embodiments of the present invention to enable instructions to be pre-fetched into the instruction cache using the techniques of the present invention. For the sake of clarity, FIG. 3 illustrates separate cache controllers for each cache, such that a cache controller 300 is provided for controlling the instruction cache 210, and a cache controller 310 is provided for controlling the data cache 200.

Before discussing the technique employed to pre-fetch instructions for storage in the instruction cache 210, the technique used to pre-fetch data values for storage in the data cache 200 will first be discussed. Firstly, the processor core 100 is arranged to issue an instruction address for a particular MCR instruction over the instruction address bus 245, this resulting in this MCR instruction being returned on the instruction data bus 250 to the processor core 100. In addition, this MCR instruction will also be received by the coprocessor pipeline follower 120 over the instruction data bus 250. Within the processor core 100 and the coprocessor 120, this MCR instruction will be decoded and subsequently executed. The processing of this MCR instruction within the coprocessor 120 will cause the coprocessor 120 to issue a command to one of its registers 330 to cause that register to update its value based on a data value output by the processor core 100. The execution of the MCR instruction within the processor core 100 will cause the appropriate data value to be output from the processor core to the register 330. It will be assumed for the sake of clarity that this register 330 is connected in the usual manner to the data data bus 275, and hence the data value will be output on the data data bus 275, and then read by the register 330. However, it will be appreciated that the register 330 need not be connected to the data data bus 275, and that the earlier described techniques may instead be used to route the data value to the register 330 via either of the address buses 245 or 265.

The register 330 updated as a result of the MCR instruction contains a value used by the data cache 200 to determine the cache line pointed to by the data cache pointer. When the data cache pointer is pointing to a specific cache line, then it is that cache line to which subsequent data values passed to the data cache 200 are stored.

While the MCR instruction is being executed, other instructions will have been retrieved from the instruction cache, these for example being instructions to load data into a processor register (such instructions being referred to as "Load Register" (LDR) instructions hereafter). These instructions will hence be processed by the processor core 100 so as to cause a data address to be output over the data address bus 265 corresponding to the address of the data value to be loaded in to the processor register. If the data value is not already in the data cache 200, this will cause the data value to be retrieved from memory 170 and stored in the cache line pointed to by the data cache pointer. Typically, an entire cache line of data will be retrieved from the memory 170 and stored in the data cache 200. Further, the data value requested by the processor core 100 will be returned to the processor core over the data data bus 275 for storage in the processor register.

After a whole cache line has been updated, another MCR instruction can be executed by both the coprocessor 120 and the processor core 100 to cause the coprocessor register 330 to be updated based on the data value output by the processor core 100. The updating of this register will cause the data cache 200 to increment the data cache pointer, preferably by a value of one, so that the data cache pointer now points to the next cache line in the data cache 200.

Further LDR instructions can then be processed to cause additional data values to be added into the data cache 200 as required. Finally, a further MCR instruction can be used to cause the coprocessor 120 to issue a command to one of its registers 330 to cause that register to read a data value output by the processor core 100. Again, it will be assumed that this register 330 is connected to the data data bus 275, and the data value loaded into that register will define a number of caches lines which are to be "locked down" within the data cache. By this approach, if cache lines 0 and are prefilled with data values using the above described approach, then this MCR instruction can be used to enter a value in a coprocessor register 330 indicating that cache lines 0 and 1 are "locked down". The presence of this data in the coprocessor register 330 will ensure that the data cache 200 does not subsequently overwrite any of the data values in cache lines 0 and 1 so that these data values are always available to the processor core 100 as required.

While the above described technique is suitable for pre-fetching data values for storage in the data cache 200, it cannot be used to pre-fetch instructions for storage in the instruction cache 210. This is because the processor core is arranged such that every time it issues an instruction address on the instruction address bus 245, it expects to receive that instruction back on the instruction data bus 250, this instruction then being placed in the pipeline for subsequent execution. Hence, using the standard arrangement, it is not possible to pre-fetch instructions into the instruction cache without also executing those instructions within the processor core 100. However, the above described technique illustrated with reference to FIG. 2 enables coprocessor data to be output on the instruction address bus 245. The following described technique takes advantage of this in order to allow pre-fetching of instructions to the instruction cache 210.

As discussed earlier, whenever the processor core 100 outputs an instruction address on the instruction address bus 245, it also issues an InMREQ control signal on the instruction control bus 285. This InMREQ signal is received by the cache controller 300 which then causes the instruction cache 200 to compare that address with the addresses in the instruction cache, and, if the address matches one of the addresses in the instruction cache 210, the instruction cache 210 then returns the corresponding instruction on the instruction data bus 250. If the address does not correspond to any of the addresses in the instruction cache 210, then the cache controller 300 is used to retrieve the instruction from the memory 170 via the external bus 180, and this instruction is then stored within the instruction cache 210 and also returned to the processor core via the instruction data bus 250. Hence, whether there is a cache hit or a cache miss, the instruction will ultimately be returned to the processor core 100 for subsequent execution.

However, if an MCR instruction is used to cause the processor core to output coprocessor data on the instruction address bus 245, then the processor core will not issue the InMREQ signal on the instruction control bus 285, since it will not wish the instruction cache 210 to perform an instruction fetch process. In accordance with preferred embodiments of the present invention, an MCR instruction has been defined which causes the processor core 100 to output as coprocessor data on the instruction address bus 245 an instruction address for an instruction that is desired to be pre-fetched into the instruction cache 210. Further, the MCR instruction causes the coprocessor 120 to issue an InMREQ signal over path 340 to a logic gate 350.

In preferred embodiments, the InMREQ signal takes the form of a logic '0' signal on either the instruction control bus 285 or the path 340. In such cases, the logic gate 350 is an AND gate, such that the presence of an InMREQ signal on either the instruction control bus 285 or the path 340 will cause the InMREQ signal to be passed to the cache controller 300. It will be appreciated by those skilled in the art that if the InMREQ signal takes the form of a logic '1' signal, then the logic gate 350 would be an OR gate, rather than an AND gate.

Thus, when the above described MCR instruction is executed, the cache controller 300 will respond to the InMREQ signal generated by the coprocessor 120 to cause the instruction cache 210 to perform a cache look up based on the coprocessor data (in this case an actual instruction address) output by the processor core on the instruction address bus 245. Assuming a cache miss results, the cache controller 300 will retrieve the instruction (or preferably an entire cache line) from the memory 170 for storage in the instruction cache 210. Typically, the instruction corresponding to the instruction address will also be output on the instruction data bus 250 to the processor core 100. However, since the processor core 100 did not issue the InMREQ signal, it ignores any instruction data returned on the instruction data bus 250.

Thus, a similar process can be used to pre-fetch instructions into the instruction cache as that used to pre-fetch data values into the data cache, but instead of the LDR instructions used to load data values into the data cache, the above described new MCR instruction can be used to fetch instructions for storage in the instruction cache. In addition, the earlier described MCR instructions can be used to update coprocessor registers 330 to define the position of the instruction cache pointer, and to define the cache lines to be "locked down" subsequent to the completion of the instruction pre-fetch procedure.

Figure 4:
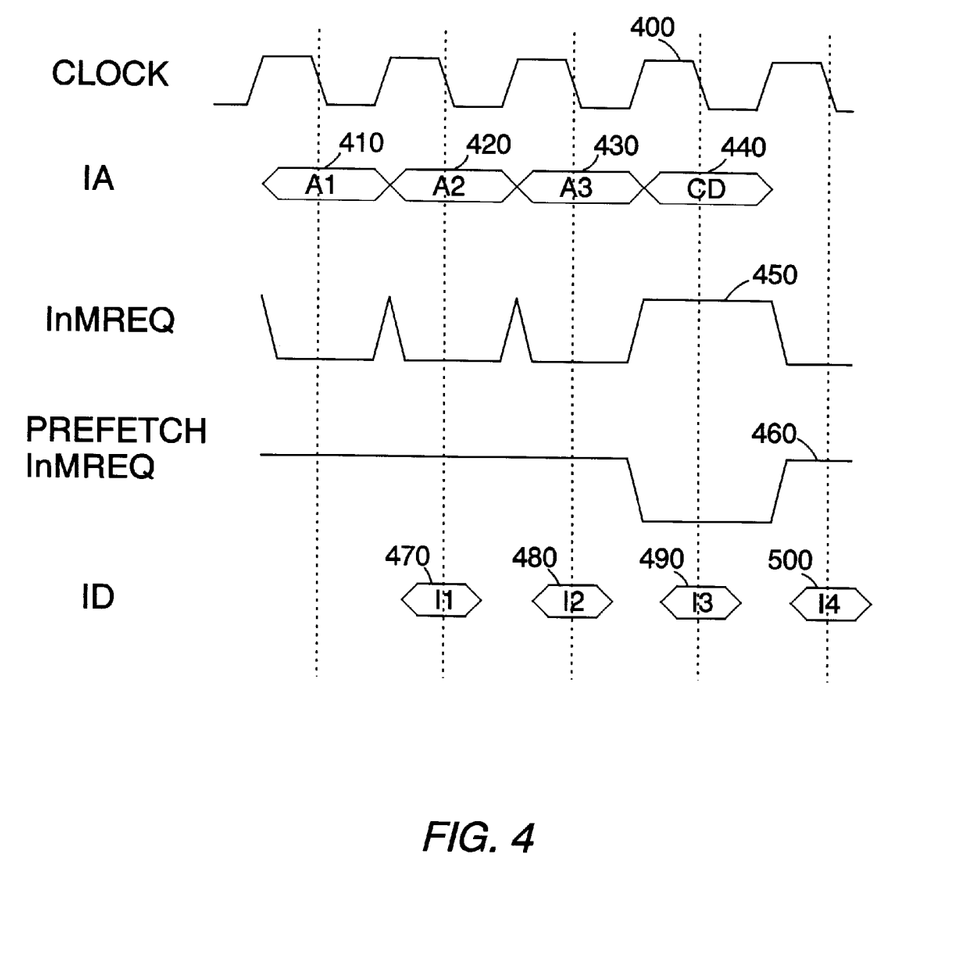
FIG. 4 is a timing diagram illustrating the relationship between the various signals generated by the apparatus illustrated in FIG. 3.

FIG. 4 is a timing diagram illustrating the signals generated by the data processing apparatus illustrated in FIG. 3. On the rising edge of the clock signal 400, instruction addresses 410, 420, 430 are output by the processor core 100 on the instruction address bus 245. While the instruction addresses 410, 420, 430 are present on the instruction address bus 245, the InMREQ signal issued by the processor core 100 on the instruction control bus 285 is driven low, this causing the instruction cache to perform a look up process based on the instruction addresses on the instruction address bus 245. This will result in instructions 470, 480, and 490, respectively, being returned on the instruction data bus 250.

However, in accordance with preferred embodiments of the present invention, when the above described MCR instruction is executed to cause the processor core to output coprocessor data 440 on the instruction address bus 245, the InMREQ signal issued by the processor core 100 on the instruction control bus 285 is held high, since in this instance the processor core 100 is not instructing the instruction cache to perform a cache look up. However, as described earlier, this coprocessor data 440 is actually an instruction address for an instruction which is desired to be stored in the instruction cache 210, and the coprocessor 120 is arranged to respond to the MCR instruction by issuing a pre-fetch InMREQ signal on the path 340 by driving that signal low during the period when the coprocessor data 440 is on the instruction address bus 245. As described earlier, this will cause the cache controller 300 to receive the InMREQ signal, and hence to cause the instruction cache to perform a cache look up based on the coprocessor data 440 present on the instruction address bus 245. This will result in the instruction 500 being returned on the ID bus 250, but this will be ignored by the processor core 100.

Hence, the above described technique allows an instruction to be pre-fetched and stored in the instruction cache without that instruction being returned to the processor core for execution, and without any additional logic needing to be added to the instruction cache to support pre-fetching. Further, if the system also has memory translation or memory protection logic, that logic can be responsive to the predetermined control signal from the coprocessor in the same way as from the processor core, and hence will treat the instruction pre-fetch in exactly the same way as a normal instruction fetch. Hence, just as for a normal instruction fetch, if the prefetch fails any protection check, the instruction will not be prefetched in to the cache.

Although a particular embodiment has been described herein it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus for fetching an instruction in to an instruction cache, comprising:

an instruction cache for storing instructions;

a processor core arranged, when an instruction is required by the processor core, to output an instruction address to the instruction cache on an instruction address bus, and to issue a predetermined control signal to the instruction cache to cause the instruction cache to perform an instruction fetch procedure, the processor core arranged to receive the instruction corresponding to that instruction address on an instruction data bus only when said processor core issues said predetermined control signal;

a coprocessor arranged, when an instruction is to be added to the instruction cache without the instruction being received by the processor core, to execute a first predetermined instruction also executed by the processor core, the first predetermined instruction causing the coprocessor to also issue a predetermined control signal to the instruction cache, and causing the processor core to output to the instruction cache the instruction address data for the instruction to be added to the instruction cache without issuing the processor core originated predetermined control signal;

the instruction cache being responsive to the coprocessor originated predetermined control signal and the instruction address from the processor core to perform the instruction fetch procedure, and, if this results in a cache miss, to cause the retrieval of the instruction from memory for storage in the instruction cache, the processor core ignoring the retrieved instruction.

2. A data processing apparatus as claimed in claim 1, wherein the first predetermined instruction causes the processor core to output the instruction address data on the instruction address bus.

3. A data processing apparatus as claimed in claim 1, wherein the first predetermined instruction is a Move to Coprocessor Register (MCR) instruction.

4. A data processing apparatus as claimed in claim 1, wherein the coprocessor has a number of coprocessor registers whose stored data values are used to control the operation of the instruction cache, a second predetermined Move to Coprocessor Register (MCR) instruction being executable to cause the coprocessor to issue an instruction to one of said number of coprocessor registers to store a data value defining the cache line pointed to by the instruction cache pointer, and to cause the processor core to output that data value for storage in the coprocessor register.

5. A data processing apparatus as claimed in claim 4, further comprising:

a data cache for storing data values, the data cache being connected to the processor core by a data address bus and a data data bus;

the processor core being arranged to output data addresses to the data cache over the data address bus, and being arranged to receive over the data data bus data values corresponding to data addresses output by the processor core on the data address bus, or to output over the data data bus data values to the data cache;

the coprocessor registers being connected to the data data bus, or to the data address bus.

6. A data processing apparatus as claimed in claim 5, wherein the coprocessor register is connected to the data address bus, and the coprocessor is arranged to send a signal to the processor core to cause the processor core to output the data value on the data address bus.

7. A data processing apparatus as claimed in claim 6, wherein the coprocessor register is connected to the instruction address bus, and the coprocessor is arranged to send a signal to the processor core to cause the processor core to output the data value on the instruction address bus.

8. A data processing apparatus as claimed in claim 1, wherein the predetermined control signal is issued by the processor core over an instruction control bus connected to the instruction cache.

9. A data processing apparatus as claimed in claim 1, wherein, in the event of a cache miss, a whole cache line containing the instruction is retrieved from memory for storage in the cache.

10. A data processing apparatus as claimed in claim 4, wherein a third predetermined Move to Coprocessor Register (MCR) instruction is executable to cause the coprocessor to issue an instruction to one of said number of coprocessor registers to store a data value defining a number of cache lines which are to be locked down in the instruction cache to avoid subsequent overwriting of the instructions stored in those cache lines, and to cause the processor core to output that data value for storage in the coprocessor register.

11. A data processing apparatus as claimed in claim 10, further comprising:

a data cache for storing data values, the data cache being connected to the processor core by a data address bus and a data data bus;

the processor core being arranged to output data addresses to the data cache over the data address bus, and being arranged to receive over the data data bus data values corresponding to data addresses output by the processor core on the data address bus, or to output over the data data bus data values to the data cache;

the coprocessor registers being connected to the data data bus, or to the data address bus.

12. A data processing apparatus as claimed in claim 11, wherein the coprocessor register is connected to the data address bus, and the coprocessor is arranged to send a signal to the processor core to cause the processor core to output the data value on the data address bus.

13. A data processing apparatus as claimed in claim 12, wherein the coprocessor register is connected to the instruction address bus, and the coprocessor is arranged to send a signal to the processor core to cause the processor core to output the data value on the instruction address bus.

14. A method of operating a data processing apparatus to fetch an instruction in to an instruction cache, comprising the steps of:

outputting from a processor core an instruction address to the instruction cache on an instruction address bus;

outputting, when an instruction is required by the processor core, from the processor core a predetermined control signal to the instruction cache while outputting the instruction address to cause the instruction cache to perform an instruction fetch procedure;

receiving at the processor core on an instruction data bus the instruction corresponding to the instruction address only when the processor core has issued said predetermined control signal;

arranging, when an instruction is to be added to the instruction cache without the instruction being received by the processor core, a coprocessor and the processor core to execute a first predetermined instruction, the first predetermined instruction causing the coprocessor to issue a predetermined control signal to the instruction cache, and causing the processor core to output to the instruction cache the instruction address data for the instruction to be added to the instruction cache without issuing the processor core originated predetermined control signal;

arranging the instruction cache to perform the instruction fetch procedure in response to the predetermined control signal from the coprocessor and the instruction address from the processor core;

if the instruction fetch procedure results in a cache miss, retrieving the instruction from memory for storage in the instruction cache, the processor core being arranged to ignore the retrieved instruction.

15. A method as claimed in claim 14, wherein the first predetermined instruction causes the processor core to output the instruction address data on the instruction address bus.

16. A method as claimed in claim 14, wherein the first predetermined instruction is a Move to Coprocessor Register (MCR) instruction.

* * * * *